May 28, 1929. A. SCHÄFER 1,714,635

VETERINARY APPLIANCE

Filed Oct. 29, 1927

Inventor:
Andreas Schäfer

Patented May 28, 1929.

1,714,635

UNITED STATES PATENT OFFICE.

ANDREAS SCHAFER, OF AUENHEIM, NEAR COLOGNE, GERMANY.

VETERINARY APPLIANCE.

Application filed October 29, 1927, Serial No. 229,762, and in Great Britain October 13, 1927.

This invention relates to a device for treating animals, particularly dogs suffering from distemper, with medicated vapors or gases, and the invention consists in the provision of a narrow upright casing divided by a vertical partition into two chambers, a larger one for the accommodation of the animal and a smaller one for the reception of the gas, the partition being provided with an aperture and with an adjustable collar in said aperture wherein the animal can be held by the neck with the head located in the gas chamber.

Figure 1:
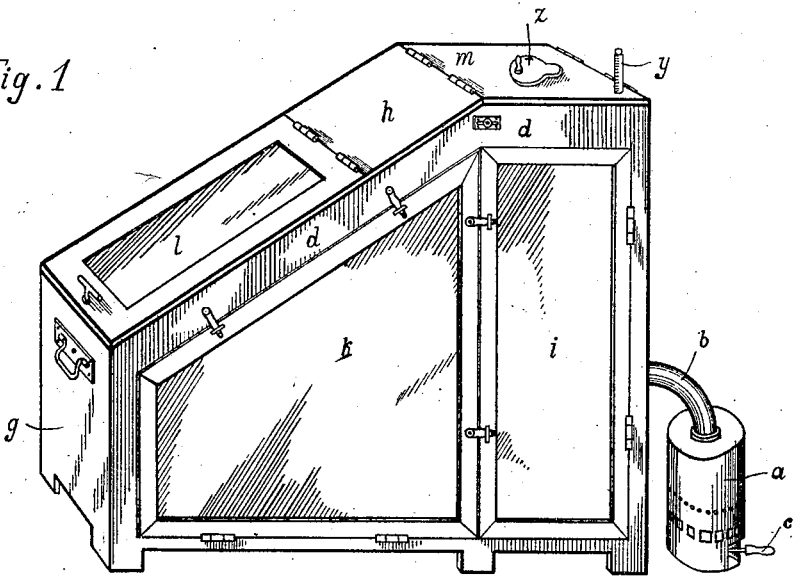
Figure 2:
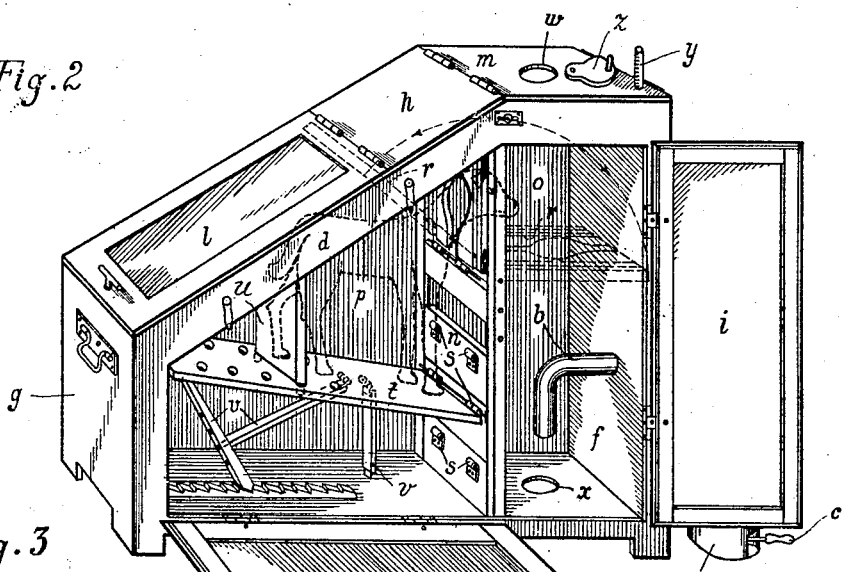
Figure 3:
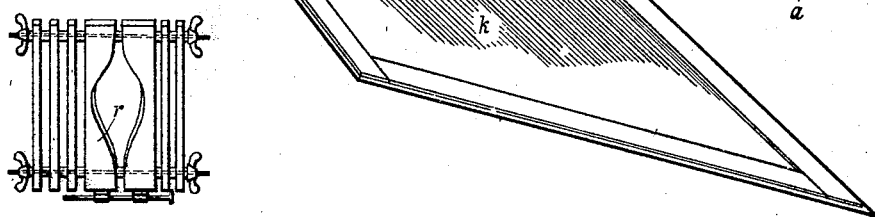

Fig. 1 of the accompanying drawing represents a perspective view of the closed apparatus, Fig. 2, a similar view of the same in open position, and Fig. 3, a view of the collar.

The apparatus is composed of a narrow upright casing $d$ which is divided by a vertical partition $n$ into two chambers, a large one P for the accommodation of the animal and a smaller one O for the reception of the gas. The top wall $h$ of the larger chamber slopes towards the rear, and a portion $l$ thereof is hinged so as to give access to the interior. The sides of the two chambers are formed of doors $k$ and $i$ which are either hinged as shown or made detachable. At the bottom of the gas chamber O there is an air inlet $x$, and in the top plate $m$, which is hinged, there is a vent $w$ which can be adjusted by means of a pivoted cover $z$. A thermometer $y$ is also fitted in the top plate. The end walls $g$ and $f$ are provided with handles whereby the casing can be carried. The medicated vapors or gases are produced by an outside generator $a$ supported over a gas stove $c$. The gases are led into the chamber O through a pipe $b$ which opens into the chamber in a downward direction above the air inlet $x$.

The partition $n$ is divided into vertically adjustable sections. One section comprises an adjustable collar $r$ adapted to be applied to the neck of the animal. This section is held in position by means of hinge pins and eyelets allowing it to be swung into either chamber, as shown by dotted lines in Fig. 2.

At different altitudes of the partition there are eyelets $s$ for connection to one end of a platform $t$ which is supported on the bottom $e$ of the chamber P by means of adjustable legs $v$. On the platform $t$ there is a vertical space-restricting plate $u$ the position of which can be adjusted.

The animal is supported on the platform $t$ against the plate $u$ and is held by the neck in the collar $r$ with its head located inside the gas chamber. The platform, back rest and collar are adjusted to suit the size of the animal whose head should be located in the upper part of the gas chamber.

As the gas pipe opens directly over the air inlet the gases will be thoroughly mixed with incoming fresh air.

The purpose of the partition $n$ is chiefly to restrict the movements of the animal, and the partition is not intended to form a tight closure between the compartments.

I claim:

1. An apparatus for treating dogs and other animals with medicated vapor or gases, comprising a narrow upright casing, a vertical partition dividing the casing into a larger and a smaller chamber, an adjustable platform in the larger chamber for supporting the animal, an adjustable collar forming part of the partition adapted to hold the animal by the neck with the head located inside the smaller chamber, and means for supplying a gas and air mixture to said smaller chamber.

2. A structure as claimed in claim 1 wherein the partition is made up of adjustable sections wherein the collar portion is adjustable about a horizontal hinge.

3. The structure claimed in claim 1 in combination with a vertical space-restricting plate connected adjustably to the platform.

ANDREAS SCHAFER.